United States Patent
Holme et al.

(10) Patent No.: US 7,813,982 B2
(45) Date of Patent: Oct. 12, 2010

(54) UNIT-BASED PREPAID PRESENTATION INSTRUMENT ACCOUNTS AND METHODS

(75) Inventors: Gary Holme, Centennial, CO (US); Wayne Joseph Martin, Coral Springs, FL (US)

(73) Assignee: First Data Corporation, Greenwood Village, CO (US)

( * ) Notice: Subject to any disclaimer, the term of this patent is extended or adjusted under 35 U.S.C. 154(b) by 247 days.

(21) Appl. No.: 11/764,324

(22) Filed: Jun. 18, 2007

(65) Prior Publication Data

US 2008/0195497 A1    Aug. 14, 2008

Related U.S. Application Data

(63) Continuation-in-part of application No. 11/283,532, filed on Nov. 18, 2005, which is a continuation-in-part of application No. 10/984,354, filed on Nov. 8, 2004, now abandoned.

(51) Int. Cl.
G06Q 40/00 (2006.01)
(52) U.S. Cl. .......................................... 705/35; 705/40
(58) Field of Classification Search ............... 705/1–80; 235/381
See application file for complete search history.

(56) References Cited

U.S. PATENT DOCUMENTS

| | | |
|---|---|---|
| 3,599,151 A | 8/1971 | Harr |
| 3,833,395 A | 9/1974 | Gosnell |
| 4,321,672 A | 3/1982 | Braun et al. |
| 4,562,340 A | 12/1985 | Tateisi et al. |
| 4,562,341 A | 12/1985 | Ohmae et al. |
| 4,630,200 A | 12/1986 | Ohmae et al. |
| 4,678,895 A | 7/1987 | Tateisi et al. |
| 4,722,554 A | 2/1988 | Pettit |

(Continued)

FOREIGN PATENT DOCUMENTS

EP    0 481 135 A1    4/1992

(Continued)

OTHER PUBLICATIONS

Business Wire, "E-Commerce, Email and E-Greeting Cards Combine in New Web Site Designed by Interactive Bureau, Flooz.com Features a Fun Online Gift Currency You Send by Email for Any Occasion," 2 pages, Sep. 14, 1999.

(Continued)

*Primary Examiner*—James P Trammell
(74) *Attorney, Agent, or Firm*—Townsend and Townsend and Crew LLP

(57) ABSTRACT

Methods and/or systems for providing preauthorization and transaction settlement for a transaction using a prepaid unit-based presentation instrument are disclosed, wherein the presentation instrument includes a unit balance. The method may include receiving a preauthorization request that includes a price-per-unit and a preauthorization amount. The methods and/or systems may then determine whether the unit balance is sufficient to cover the preauthorization amount. If the unit balance is sufficient to cover the preauthorization amount, the presentation instrument is authorized for the transaction. If the unit balance is insufficient to cover the preauthorization amount, a currency balance is determined from the unit balance and the price-per-unit, authorizing the presentation instrument for a transaction up to the currency balance and sending an indication that the currency balance is authorized for the transaction.

6 Claims, 10 Drawing Sheets

U.S. PATENT DOCUMENTS

| | | | |
|---|---|---|---|
| 4,812,628 A | 3/1989 | Boston et al. |
| 4,902,881 A | 2/1990 | Janku |
| 4,961,142 A | 10/1990 | Elliott et al. |
| 5,053,607 A | 10/1991 | Carlson et al. |
| 5,119,293 A | 6/1992 | Hammond |
| 5,175,682 A | 12/1992 | Higashiyama et al. |
| 5,220,501 A | 6/1993 | Lawlor et al. |
| 5,233,167 A | 8/1993 | Markman et al. |
| 5,367,452 A | 11/1994 | Gallery et al. |
| 5,408,077 A | 4/1995 | Campo et al. |
| 5,426,594 A | 6/1995 | Wright et al. |
| 5,464,971 A | 11/1995 | Sutcliffe et al. |
| 5,484,988 A | 1/1996 | Hills et al. |
| 5,491,325 A | 2/1996 | Huang et al. |
| 5,504,677 A | 4/1996 | Pollin |
| 5,510,979 A | 4/1996 | Moderi et al. |
| 5,555,496 A | 9/1996 | Tackbary et al. |
| 5,577,109 A | 11/1996 | Stimson et al. |
| 5,622,388 A | 4/1997 | Alcordo |
| 5,650,604 A | 7/1997 | Marcous et al. |
| 5,657,201 A | 8/1997 | Kochis |
| 5,677,955 A | 10/1997 | Doggett et al. |
| 5,679,940 A | 10/1997 | Templeton et al. |
| 5,699,528 A | 12/1997 | Hogan |
| 5,757,917 A | 5/1998 | Rose et al. |
| 5,794,207 A | 8/1998 | Walker et al. |
| 5,815,657 A | 9/1998 | Williams et al. |
| 5,825,617 A | 10/1998 | Kochis et al. |
| 5,826,241 A | 10/1998 | Stein et al. |
| 5,828,875 A | 10/1998 | Halvarsson et al. |
| 5,832,463 A | 11/1998 | Funk |
| 5,878,211 A | 3/1999 | Delagrange et al. |
| 5,893,080 A | 4/1999 | McGuri et al. |
| 5,910,988 A | 6/1999 | Ballard |
| 5,949,044 A | 9/1999 | Walker et al. |
| 5,960,412 A | 9/1999 | Tackbary et al. |
| 5,987,426 A | 11/1999 | Goodwin, III |
| 6,029,150 A | 2/2000 | Kravitz |
| 6,030,000 A | 2/2000 | Diamond |
| 6,032,133 A | 2/2000 | Hilt et al. |
| 6,032,137 A | 2/2000 | Ballard |
| 6,039,245 A | 3/2000 | Symonds et al. |
| 6,058,417 A | 5/2000 | Hess et al. |
| 6,064,990 A | 5/2000 | Goldsmith |
| 6,070,798 A | 6/2000 | Nethery |
| 6,097,834 A | 8/2000 | Krouse et al. |
| 6,106,020 A | 8/2000 | Leef et al. |
| 6,119,106 A | 9/2000 | Mersky et al. |
| 6,122,625 A | 9/2000 | Rosen |
| 6,149,056 A | 11/2000 | Stinson et al. |
| 6,164,528 A | 12/2000 | Hills et al. |
| 6,175,823 B1 | 1/2001 | Van Dusen |
| 6,193,152 B1 | 2/2001 | Fernando et al. |
| 6,199,761 B1 | 3/2001 | Drexler |
| 6,246,996 B1 | 6/2001 | Stein et al. |
| 6,305,604 B1 | 10/2001 | Ono |
| 6,308,887 B1 | 10/2001 | Korman et al. |
| 6,321,984 B1 | 11/2001 | McCall et al. |
| 6,327,570 B1 | 12/2001 | Stevens |
| 6,327,575 B1 | 12/2001 | Katz |
| 6,360,254 B1 | 3/2002 | Linden et al. |
| 6,367,693 B1 | 4/2002 | Novogrod |
| 6,484,936 B1 | 11/2002 | Nicoll et al. |
| 6,539,363 B1 | 3/2003 | Allgeier et al. |
| 6,547,132 B1 | 4/2003 | Templeton et al. |
| 6,549,119 B1 | 4/2003 | Turner |
| 6,827,260 B2 | 12/2004 | Stoutenburg et al. |
| 6,886,742 B2 | 5/2005 | Stoutenburg et al. |
| 7,086,584 B2 | 8/2006 | Stoutenburg et al. |
| 2001/0049651 A1 | 12/2001 | Selleck |
| 2001/0051876 A1 | 12/2001 | Seigel et al. |
| 2002/0153414 A1 | 10/2002 | Stoutenburg et al. |
| 2003/0097321 A1 | 5/2003 | Arikawa et al. |
| 2003/0197060 A1* | 10/2003 | Coyner ................. 235/381 |
| 2004/0098326 A1* | 5/2004 | James et al. .............. 705/36 |

FOREIGN PATENT DOCUMENTS

| | | |
|---|---|---|
| EP | 0 949 596 A2 | 10/1999 |
| EP | 1 077 436 A2 | 2/2001 |
| WO | WO 00/46725 A1 | 8/2000 |
| WO | WO 00/67177 A2 | 11/2000 |
| WO | WO 01/04816 A1 | 1/2001 |
| WO | WO 02/05195 A1 | 1/2002 |

OTHER PUBLICATIONS

Confinity, Inc., "How PayPal.com Works," http://www.paypal.com/cgi-bin/webscr?cmd=paypal-works, 2 pages, 2000.

dotBank by Arthas Corp., "The Way to Send and Receive Money on the Internet," http://www.dotbank.com, 7 pages, 1999.

Idealab, "payme.com," https://ssl.idealab.com, 7 pages, downloaded on Feb. 16, 2000.

PR Newswire, GiftSpot.com Simplifies Gift-Giving on the Internet, 5 pages, Oct. 20, 1999.

U.S. Appl. No. 10/984,354, Office Action, 9 pages, Jul. 9, 2007.

Verifone Finance, "Tranz 300—Fast, Low-Cost Transaction Automation At the Point of Service," http://web.archive.org/web/19990219180438/http://www.vfi-finance.com/tranz330.htm, 3 pages, Jan. 1999.

X.com, "Do More With Your Money," http://www.x.com, 5 pages, downloaded on Feb. 7, 2000.

International Search Report and Written Opinion of the International Search Authority, dated Nov. 1, 2007, corresponding to PCT International Application No. PCT/US06/43490, filed Nov. 7, 2006.

\* cited by examiner

[Customer Buys Stored-Value Token with $100 Value]

(a)
2/1

| Cash Value | Futures | Options |
|---|---|---|
| $100 | | |
| | | |
| | | |

[Customer Buys Goods for $50]

(b)
2/15

| Cash Value | Futures | Options |
|---|---|---|
| $50 | | |
| | | |
| | | |

[Customer Adds $200 Value to Token]

(c)
3/1

| Cash Value | Futures | Options |
|---|---|---|
| $250 | | |
| | | |
| | | |

[Customer Enters Futures Contract with ABC Company]

(d)
3/15

| Cash Value | Futures | Options |
|---|---|---|
| $250 ($90) | ABC  100 gal.  (3/26 - 4/2)  $160 | |
| | | |
| | | |

[Customer Attempts to Buy Goods for $100]

(e)
3/20

| Cash Value | Futures | Options |
|---|---|---|
| $250 ($90) | ABC  100 gal.  (3/26 - 4/2)  $160 | |
| | | |
| | | |

Fig. 4A

UNIT-BASED PREPAID PRESENTATION INSTRUMENT ACCOUNTS AND METHODS

CROSS REFERENCE TO RELATED APPLICATION

This application is a continuation-in-part of U.S. patent application Ser. No. 11/283,532, filed Nov. 18, 2005, entitled "Derivative Currency-Exchange Transactions," which is a continuation-in-part of U.S. patent application Ser. No. 10/984,354, filed Nov. 8, 2004, entitled "Methods And Systems For Implementing Derivative Transactions," the entire disclosures of which are incorporated herein by reference for all purposes.

BACKGROUND OF THE INVENTION

This application relates generally to derivative transactions. More specifically, this application relates to methods and systems for implementing derivative transactions.

As used herein, references to a "derivative transaction" are intended to refer to a transaction derived at least in part from another transaction that may be executed in the future. Execution of derivative transactions generally take the form of execution of an underlying contract between two parties. One example of a derivative transaction is a "futures transaction," which is intended to refer herein to a transaction based on a futures contract between two parties specifying a date and certain terms for execution of the futures contract. Another example of a derivative transaction is an "option transaction," which is intended to refer herein to a transaction based on an option contract between two parties securing the right of at least one of the parties to execute a defined transaction.

The derivatives market has developed a great deal of complexity and is most often associated with relatively sophisticated investment strategies. Relatively few individual consumers and small business make practical use of the underlying derivatives as a mechanism for managing costs in a predictable way. Yet this ability is a primary benefit of the derivatives themselves. The very complexity associated with managing derivatives has acted as a barrier to their practical use by individuals and small businesses. The result has been the development of system that is generally more concerned with the trade of derivatives and how profit may be generated by their purchase and sale, rather than their use as cost-management instruments.

There is accordingly a general need in the art for methods and systems for implementing derivative transactions that provide more convenience and ease of execution and use.

BRIEF SUMMARY OF THE INVENTION

Embodiments of the invention provide methods for executing a transaction between a first party and a second party. Instructions are received at a host system to stage the transaction. The instructions includes specification of terms of the transaction and specification of a trigger value of a fluctuating parameter. The terms of the transaction are dependent on a value of the fluctuating parameter. Confirmation is received that funds have been collected from the first party in support of the transaction. Thereafter, the value of the fluctuating parameter is monitored. It is determined whether the monitored value of the fluctuating parameter is at least as favorable to the first party as the trigger value.

In one such embodiment, it is determined that the monitored value of the fluctuating parameter is at least as favorable to the first party as the trigger value. In such an embodiment, the transaction is executed with terms in accordance with the monitored value of the fluctuating parameter. In another embodiment, it is determined that the monitored value of the fluctuating parameter is not as favorable to the first party as the trigger value. In such an embodiment, a refund of the funds to the first party is initiated.

A method for providing preauthorization for a transaction using a prepaid unit-based presentation instrument is also disclosed according to another embodiment of the invention. The presentation instrument may includes a unit balance, for example, a balance of gallons of gas that have been prepurchased by the user. A financial processor, financial network computer and/or financial institution system may receive a preauthorization request from a point of sale device for a unit-based transaction using a presentation instrument. The preauthorization request may include geographic location information (for example, a state and/or a zip code), a price-per-unit (for example, price per gallon of gas), product code (for example, fuel grade code), and/or a preauthorization amount. The unit balance on the presentation instrument may then be converted into a currency amount and a determination is made whether this amount is sufficient to cover the preauthorization amount. This determination may be made by comparing the preauthorization amount with the currency amount.

If the unit balance is sufficient to cover the preauthorization amount, then the presentation instrument is authorized for the transaction and an indication that the preauthorization amount is authorized for the transaction is sent to the POS. On the other hand, if the unit balance is insufficient to cover the preauthorization amount, then a currency balance is determined from the unit balance and possibly the price-per-unit. The presentation instrument may then be authorized based on the currency balance. An indication of this currency balance is then sent to the POS.

The method may further comprise determining whether the geographic location of the point of sale device is within a geographic area authorized by the presentation instrument limits. Moreover, the method may include determining whether the product code is a product code associated with the presentation instrument limits. The method may be easily adapted for use in conjunction with a gas pump. A POS device may be coupled with a gas pump and the presentation instrument may be a gas card.

A method for settling a transaction using a prepaid unit-based presentation instrument is disclosed according to one embodiment of the invention. The method may include receiving a transaction amount and price-per-unit from a point of sale device. The number of units corresponding to the transaction amount may be calculated using a price-per-unit and the balance on the presentation instrument may be decreased by the number of units corresponding to the transaction amount. In a specific example, the presentation instrument is a preloaded gallon-based gas card and the price-per-unit is a price per gallon of gas. The remaining unit balance on the transaction card may be calculated and sent to the POS.

A point of sale (POS) device coupled with a gas pump is also disclosed according to one embodiment of the invention. The POS device may include a user interface, a network interface and computational logic. The user interface, for example, may include a card reader, a screen and input buttons. The network interface may be coupled to a financial network and may be in communication with a financial processor. An account number associated with a presentation instrument may be received through the card reader. An indication of a gas type may be received from a user through the user interface. The account number, gas type and the priceper-gallon for the selected gas type may be transmitted to a financial processor through the network interface. An indication whether the presentation instrument is approved to purchase gas may be received from the financial processor through the network interface.

The POS may determine whether the account number is associated with a unit-based prepaid gas card and/or receive an indication of the amount of gas approved for a transaction. The POS may include a gas pump interface that communicates information to the POS such as the price-per-gallon, the number of gallons, and/or transaction amount. The POS may also send an authorization amount to the gas pump through the gas pump interface.

Embodiments of the invention provide methods for executing a money transfer from a first party to a second party. Customer instructions are received at a host system to stage the money transfer. The instructions include specification of an amount of money to be transferred, specification of a first currency in which the funds are to be provided by the first party, specification of a second currency different from the first currency in which the funds are to be received by the second party, and specification of a trigger currency exchange rate. Confirmation is received that the funds have been collected from the first party. A currency exchange rate between the first currency and the second currency is monitored. It is determined whether the monitored currency exchange rate is at least as favorable for the first party as the trigger currency exchange rate.

In different embodiments, the amount of money to be transferred may be specified in the first currency or may be specified in the second currency. In different embodiments, the customer instructions may be received at the host system over the Internet or from an in-person money-transfer location.

In some embodiments, a determination is made that the monitored currency exchange rate is at least as favorable as the trigger currency exchange rate. In such an instance, the funds are converted from the first currency to the second currency at the monitored currency exchange race and the converted funds are transferred to the control of the second party. The monitored currency exchange rate may sometimes be more favorable than the trigger currency exchange rate. In such a case, the amount of money to be transferred may be increased by an excess corresponding to a difference between the monitored currency exchange rate and the trigger currency exchange rate. Alternatively, a refund of the excess may be initiated.

In other embodiments, it may be determined that the monitored currency exchange rate has not become at least as favorable as the trigger currency exchange rate within a defined time. In some such instances, the funds may be refunded to the customer. In another embodiment, the currency exchange rate between the first currency and the second currency may be monitored for a second defined time. In a further embodiment, the funds may nonetheless be converted from the first currency to the second currency at the monitored currency exchange rate, with the converted funds being transferred to the control of the second party.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIGS. 4A-4C illustrate the status of certain information that may be maintained in implementing methods of the invention in an exemplary embodiment.

DETAILED DESCRIPTION OF THE INVENTION

1. Stored-Value-Account Implementations

Embodiments of the invention provide methods and systems for handling derivative transactions by using techniques developed for implementing stored-value accounts. A typical stored value account operates by providing a host system that manages the stored-value account, maintaining records of such information as how much value exists in the account, where the value may be used, etc. Generally, a token is provided to an owner of the stored-value account, such as in the form of a magnetic-stripe card, although other tokens may be used, such as in the form of a chip card, rf device, and the like. When a transaction is to be executed using the value stored in the account, the customer provides the token at the time of the transaction, and information is read from the token to identify the account. This identifier is transmitted to the host system, which retrieves records of the amount of value available for use and confirms that the transaction may proceed. The host system debits the value applied during the transaction from the account and performs settlement functions to ensure that the other party to the transaction is credited with that value.

Embodiments of the invention use such an arrangement for the implementation of derivative transactions. For purposes of illustration, consider the case of a small business owner who has a generally predictable need for a commodity, such as gasoline. The business owner would like to take advantage of the periodically lower costs for the gasoline by buying greater volumes of it, but lacks storage capacity to hold significant volumes. A derivative would provide a convenient mechanism for the business owner to manage costs, such as by purchasing futures of gasoline at lower costs in accordance with the predicted needs. Similarly, the business owner might sometimes recognize the possibility of a higher-than-average short-term need for gasoline, in which case costs may be effectively managed through purchase of an option. Use of a stored-value arrangement significantly increases the ease of entering and managing such derivative-transaction arrangements.

Figure 1:
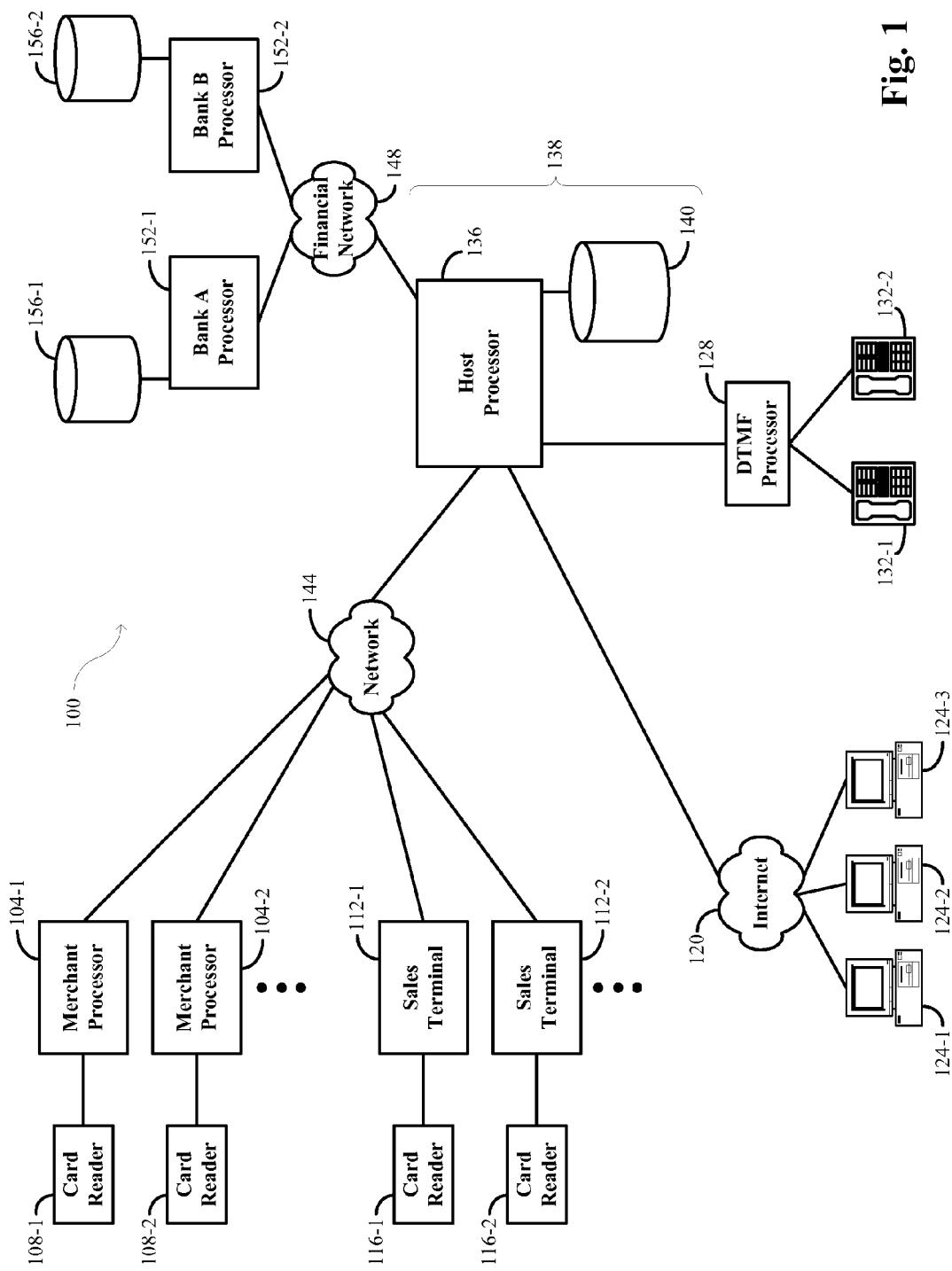
FIG. 1 is a block-diagram representation of an exemplary architecture for implementing methods of the invention in an embodiment.

FIG. 1 provides a general overview of an architecture 100 that may be used in implementing embodiments of the invention. The host system 138 that coordinates the transfer of information and that maintains account records comprises a host processor 136 and a data store 140. The host system 138 is provided in communication with a number of other elements of the architecture through communications links with the host processor 136. The communications links may be electrical, optical, wireless, or any other type of communications link known to those of skill in the art.

Communications with point-of-sale devices, which may be used when a stored-value token is initially acquired or when a transaction involving the stored-value token is executed, may be routed through a network 144. Because of the sensitive financial nature of the communications, the network 144 usually comprises a secure network. The drawing distinguishes between merchant processors 104, which refer herein to parts of point-of-sale devices that are used in communicating information as part of executing a transaction, and sales terminals 112, which refer herein to parts of point-of-sale devices used when a stored-value token is initially provided to a customer. This distinction is largely conceptual since the same physical devices may usually be used for either or both functions. For purposes of illustration, the point-sale-devices are shown as including a card reader 108 or 116 in communication with the merchant processor 104 or sales terminal 112 for reading magnetic-stripe information in those embodiments where the stored-value token comprises a magnetic-stripe card. In other embodiments, other reading devices as appropriate for the type of token may be used instead. The point-of-sale devices may generally take a variety of different forms, including devices that may be operated by merchant clerks or may be self-operated by customers. The card reader may also include an RFID reader.

Examples of point-of-sale devices that have varied functionality are described in the following commonly assigned applications, the entire disclosures of which are incorporated herein by reference for all purposes: U.S. Provisional Patent Application No. 60/147,889, filed Aug. 9, 1999, entitled "Integrated Point Of Sale Device;" U.S. Pat. No. 6,547,132, filed Aug. 9, 2000, entitled "Point Of Sale Payment Terminal;" U.S. patent application Ser. No. 10/116,689, filed Apr. 3, 2002, entitled "Systems And Methods For Performing Transactions At A Point-Of-Sale;" U.S. patent application Ser. No. 10/116,733, filed Apr. 3, 2002, entitled "Systems And Methods For Deploying A Point-Of-Sale System;" U.S. patent application Ser. No. 10/116,686, filed Apr. 3, 2002, entitled "Systems And Methods For Utilizing A Point-Of-Sale System;" and U.S. patent application Ser. No. 10/116,735, filed Apr. 3, 2002, entitled "Systems And Methods For Configuring A Point-Of-Sale System."

The host processor 136 may also be provided in communication with one or more financial-institution processors 152, each of which functions as part of a system that maintains accounts on behalf of account holders on associated data stores 156. The financial institutions are identified as banks in the drawing, but may more generally be any type of financial institution, such as a trust company, and credit union, and the like. Communications between the host processor 136 and the financial-institution processors 152 take place over a financial network 148, which is generally provided as a secure network to protect the confidential and sensitive nature of the financial information that is routed.

In some instances, the host system 138 may additionally be provided in communication with other networks that permit customers to access information regarding the stored-value accounts that are maintained on the data store 140. This additional capability is generally of an administrative nature to provide functionality that permits customers to be active in the administration of these accounts. In some instances, more substantive capabilities may also be provided, enabling the customer to transfer funds between a stored-value account maintained by the host system 138 with an account maintained by one of the financial institutions. Other capabilities that might be provided include the ability to make bill payments with stored-value accounts through a network connection with the host system 138, and the like. Such additional networks may be provided in a number of different ways, such as through the use of a public network like the internet 120 that provides communications between the host processor 136 and a customer computers 124. Alternatively or additionally, the architecture 100 may support an interface to process touch-tone commands from customer telephones 132 through a dual-tone multiple-frequency ("DTMF") processor 128. The DTMF processor 128 translates telephone touch tones to enable a customer to provide instructions through a telephone 132 and transmits audible responses to the customer. Still other mechanisms that may be used in different embodiments include voice-recognition processors, cable processors, and the like. The information-security issues related to the use of public networks like the internet may be different because of the greater risk of interception than over the private networks 144 and 148. A variety of techniques known to those of skill in the art may be used to provide enhanced security, including encryption of data transmitted over such public networks. Such techniques may be used with the transmission of information also over the private networks 144 and 148 to further provide strengthened security of the information.

Figure 2:
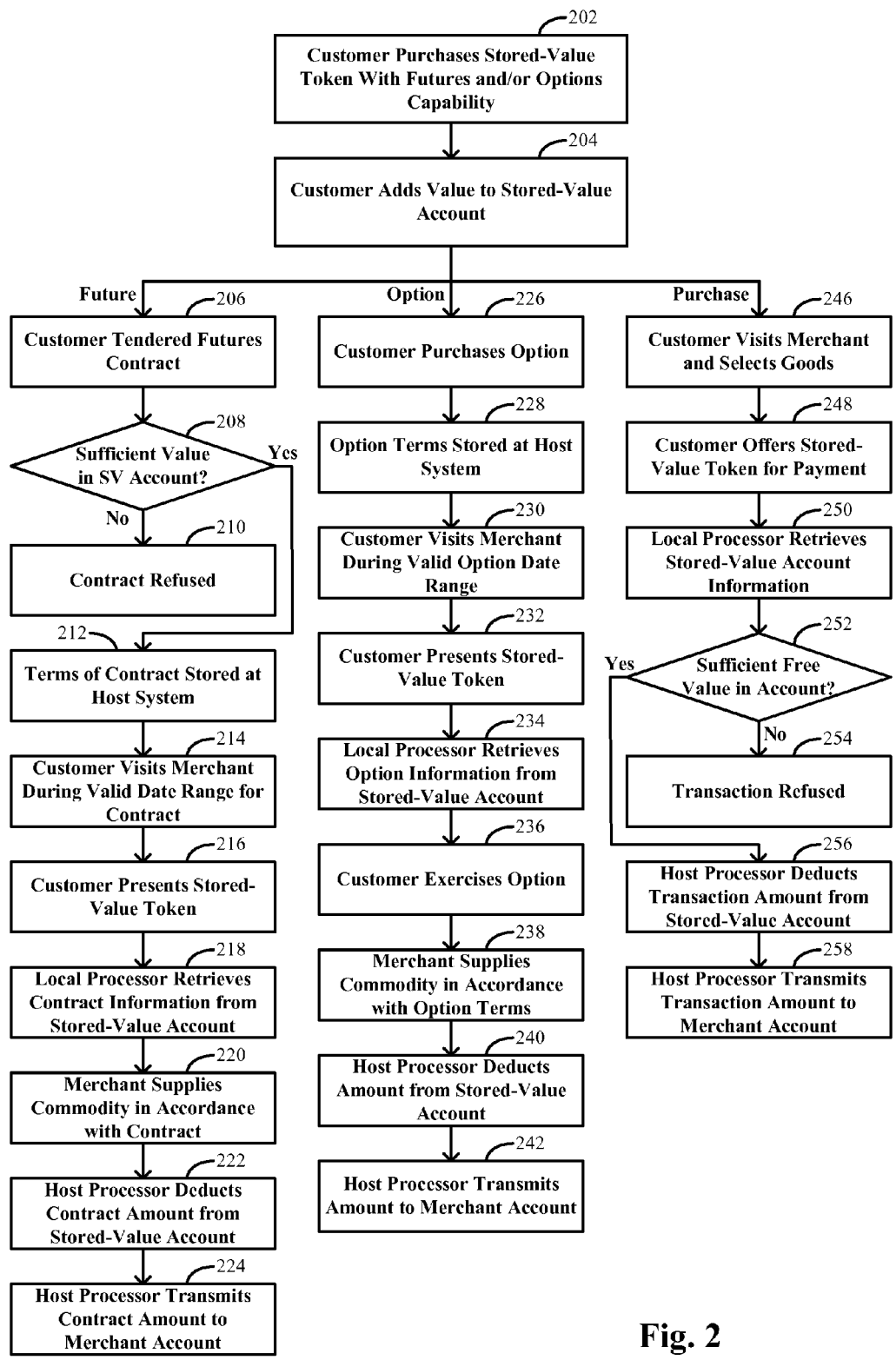
FIG. 2 is a flow diagram that summarizes various methods for using stored-value tokens as part of the methods of the invention.

An overview of methods of the invention that may be implemented with an architecture like the one shown in FIG. 1 are summarized with the flow diagram of FIG. 2. For purposes of illustration, the flow diagram shows three different types of transactions that may be executed using the stored-value token, including derivative transactions that are illustrated for a futures transaction and for an option transaction, and also including a purchase transaction using stored value. The execution of a purchase transaction is illustrated explicitly since some embodiments may provide limitations on such a transaction as part of implementing certain types of derivative transactions. For instance, a portion of the stored value for an account may be frozen when the derivative includes a future contractual obligation to ensure that there is sufficient funds support for the contractual obligation. For instance, where the derivative transaction is a futures transaction obligating the customer to make a future purchase, the value needed for that purchase may be earmarked as inaccessible for use in purchase transactions. In contrast, where the derivative transaction is an option transaction, there is no future obligation on the part of the customer to make a purchase so no value is specifically earmarked.

These different features may be illustrated by considering the different paths through the flow diagram of FIG. 2. The flow diagram begins with the initial establishment of a customer's stored-value account, as indicated at block 202 with the purchase of a stored-value token equipped for use with derivative transactions. In some instances, a purchased token may have value that has been preloaded in the account, usually an amount that is equal to the purchase price of the token. In any event, the customer may be provided with the capability of adding value to the account, as indicated at block 204, to set a particular value for the account. Adding value may be performed in any of several different ways. For instance, the customer may use the administrative connections described in connection with FIG. 1 to supply a financial account from which value may be transferred to the stored-value account identified by the token. In such instances, the host processor 136 coordinates the value transfer in accordance with instructions from the customer and by using known techniques to identify the customer's authority to initiate debit instructions to a financial account held at a financial institution. Such techniques may include verification of a customer's personal identification number ("PIN") associated with the account, and the like. Alternatively, the customer may present the token with a tendered value amount at a point-of-sale location, such as at one of the sales terminals 112 identified in FIG. 1. A clerk may swipe the card through the card reader 116 to extract the account identifier, which is transmitted to the host processor 136 to identify the account. The clerk may then accept tendered value from the customer, such as in the form of cash, a check, a credit card, etc. and key in the amount received so that the host system 138 updates the value associated with the identified account. Further ways of adding value may include similar processes that omit the involvement of the clerk by having the customer interact with a self-service device equipped with such devices as a cash collector, check reader, and the like to accept the tendered value.

Once a stored-value token has been provided to a customer and the corresponding account includes value, the token may be used in the execution of derivative transactions and purchase transactions. The left column of FIG. 2 illustrates the use of the token as part of a futures transaction, such as where the customer is tendered a futures contract at block 206. Such a contract typically includes terms specifying a date or date range when the contract is to be executed, the goods to be provided to the customer from a seller at the time of execution, and the amount of value to be provided by the customer to the seller at the time of execution. Because a specific amount of value will be needed to support the contract, a check is made at block 208 whether the stored-value account identified by the token has sufficient value. This may be done at any of the point-of-sale devices described in connection with FIG. 1 by extracting an identifier from the token and transmitting it to the host system 138 for retrieval of account information. If the account lacks sufficient value, the contract may be refused by the system at block 210.

If the account does have sufficient value, the terms of the contract are stored at the host system 138 at block 212. The storage of such terms may comprise freezing the amount of value required to support the contract so that they cannot be used as part of a purchase transaction or allocated to another futures transaction. At the time required for execution of the contract, the customer may visit the merchant, as noted at block 214, and present the stored-value token. In many instances, the location for execution of the contract may be different from the location where the terms were initially established, reflecting the fact that execution of the contract generally involves the delivery of a commodity or other goods to the customer. For instance, the terms of the contract established as part of executing the futures transaction may have taken place a sales terminal 112 located at a sales office while execution of the contract is performed with a merchant processor 104 located at a distribution center.

To execute the contract, the customer presents the stored-value token at block 216. The account identifier provided by the stored-value token is used to retrieve contract terms from the stored-value account at the host system 138 at block 218, which may be displayed to the parties on a monitor or other output device to confirm the contract terms. At block 220, the merchant supplies the commodity or other goods in accordance with the contract terms and at block 222 the host processor 136 deducts the contract amount from the stored-value account. The frozen-value amount is also reduced by the contract amount, but may not be reduced to zero if there were multiple derivative transactions executed that resulted in freezing of multiple amounts. The amount owed to the merchant as a result of executing the contract is transmitted to an account of the merchant, usually at a financial institution, at block 224. While in some instances, this may be done substantially immediately after execution of the contract, more usually it is performed as part of a settlement process that determines how changes in value handled by the host system 138 over some time period, such as a day, should be allocated among multiple merchants and financial institutions. Performing the settlement periodically in this fashion improves efficiency since the allocation of value amounts may be performed with a minimal set of transfers that defines the result of multiple transactions, rather than requiring a separate transfer for each of those transactions.

The middle column of FIG. 2 illustrates the use of the token as part of an option transaction, in which the customer purchases the right to execute a transaction without becoming obligated to do so. For example, an option transaction may be executed by a customer making payment of a certain amount in exchange for the right, which is then recorded by the system. Thus, at block 226, the customer purchases the option and the terms of the option are stored at the host system 138 at block 228. The terms of the option generally specify a date or range of dates when the option must be exercised, if at all, and specify the cost of a commodity or other goods to be supplied upon execution. If the customer fails to exercise the option before the end of the time period where he may, the recorded terms may simply be removed by the host system 138, at least from records of currently exercisable options.

In order for the customer to execute the option, he may visit the merchant at block 230 during the valid time period. As before, the execution of the option transaction may take place at a different physical location than where it is exercised, such as where the option transaction is executed with a sales terminal at a sales office and the option itself is executed with a merchant processor 104 located at a distribution center. Similar to the steps in executing a futures contract at this point, the customer presents the stored-value token at block 232 so that the local processor may retrieve the relevant option information from the stored-value account maintained by the host system 138 at block 234. In response to the customer exercising the option at block 236, the merchant supplies the commodity or other goods at block 238 in accordance with the option terms. The host processor deducts the amount to be charged from the stored-value account at block 240 and transmits that amount to the merchant account at block 242, usually as part of a periodic settlement process as described above.

The right column of FIG. 2 illustrates the use of the token as part of a purchase transaction, highlighting the effect on the availability of stored value that may be manifested as a result of enabling futures transactions to be executed. At block 246, the customer visits and merchant and selects goods for purchase. After the customer offers the stored-value token for payment at block 248, the local processor reads the account identifier from the token and uses it to retrieve the stored-value account information at block 250. If there is not sufficient free value in the account, as checked at block 252, then the purchase transaction is refused at block 254. There may be insufficient free value if the total value in the account is less than the transaction amount; alternatively, there may be insufficient free value even if the total value exceeds the transaction amount but with a portion of it frozen for use in supporting futures transactions or certain other derivative transactions. If the stored-value account has sufficient free value, the host processor deducts the transaction amount from the stored-value account at block 256 and transmits the transaction amount to a merchant account at block 258, usually as part of a periodic settlement process.

While the above discussion has focused on instances in which the future transaction is execution of a contract for a sale of goods or services, the future transaction may more generally comprise execution of any contract that requires payment by the customer. For example, in some embodiments, the future transaction comprises the purchase of a different currency by the customer, such as illustrated by an arrangement in which a customer arranges for the future purchase of 1000 euro for a cost of 1250 US dollars. Such an arrangement has the same advantages as other futures arrangements, permitting the customer to avoid future cost fluctuations, in this instance of the purchase of currency. Furthermore, in different embodiments, the transaction may be structured as a futures transaction in which the customer obligates himself to purchase the currency, or may be structured as an options transaction in which the customer secures the right to purchase a specified amount or range of currency at a specified rate.

Figure 3:
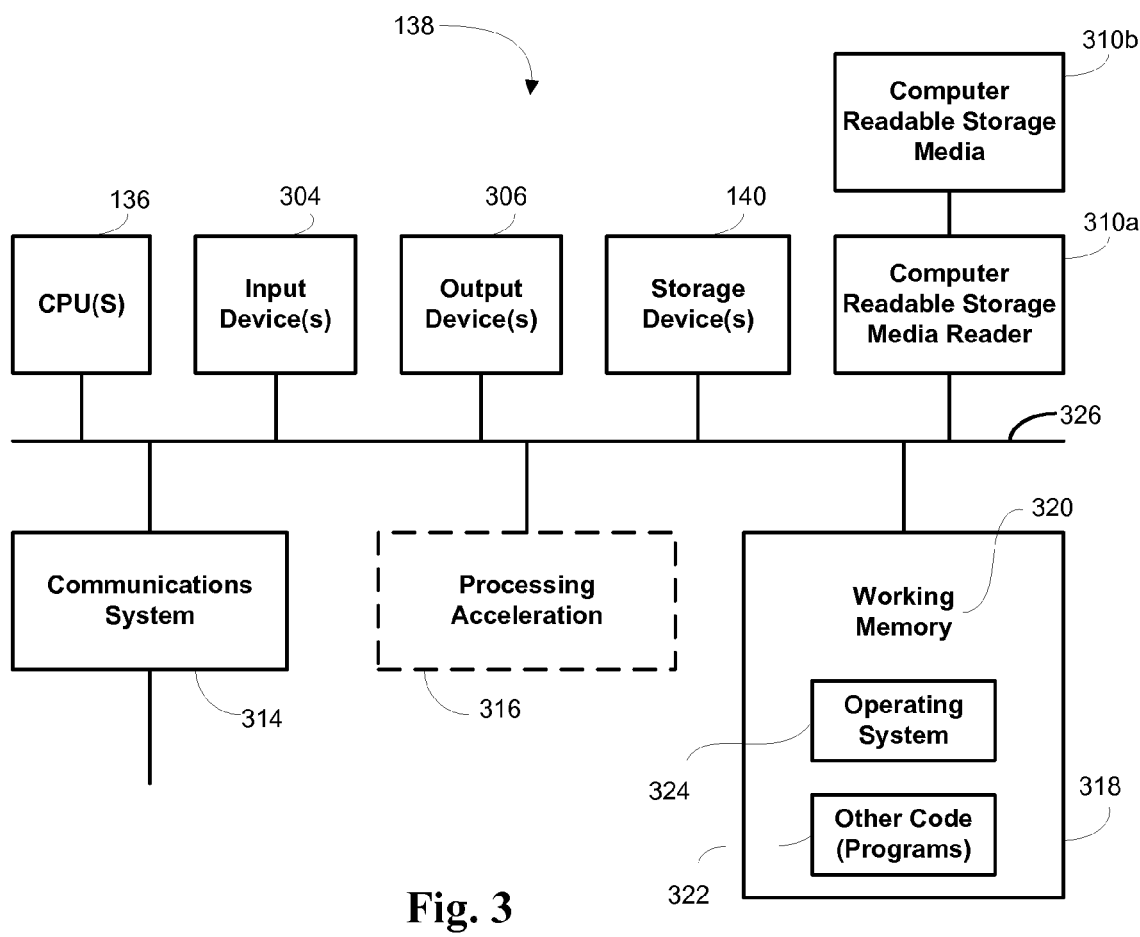
FIG. 3 is a schematic illustration of a physical structure of a host system on which methods of the invention may be embodied.

FIG. 3 provides a schematic illustration of a physical structure that may be used to implement the host system 138 in one embodiment. FIG. 3 broadly illustrates how individual system elements may be implemented in a separated or more integrated manner. The host system 138 is shown comprised of hardware elements that are electrically coupled via bus 326, including the host processor 136, an input device 304, an output device 306, the storage device 140, a computer-readable storage media reader 310a, a communications system 314, a processing acceleration unit 316 such as a DSP or special-purpose processor, and a memory 318. The computer-readable storage media reader 310a is further connected to a computer-readable storage medium 310b, the combination comprehensively representing remote, local, fixed, and/or removable storage devices plus storage media for temporarily and/or more permanently containing computer-readable information. The communications system 314 may comprise a wired, wireless, modem, and/or other type of interfacing connection and permits data to be exchanged with the networks 144, 148, 120, and 128 illustrated in FIG. 1 to implement embodiments as described.

The host system 138 also comprises software elements, shown as being currently located within working memory 320, including an operating system 324 and other code 322, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Example

Figure 4B:
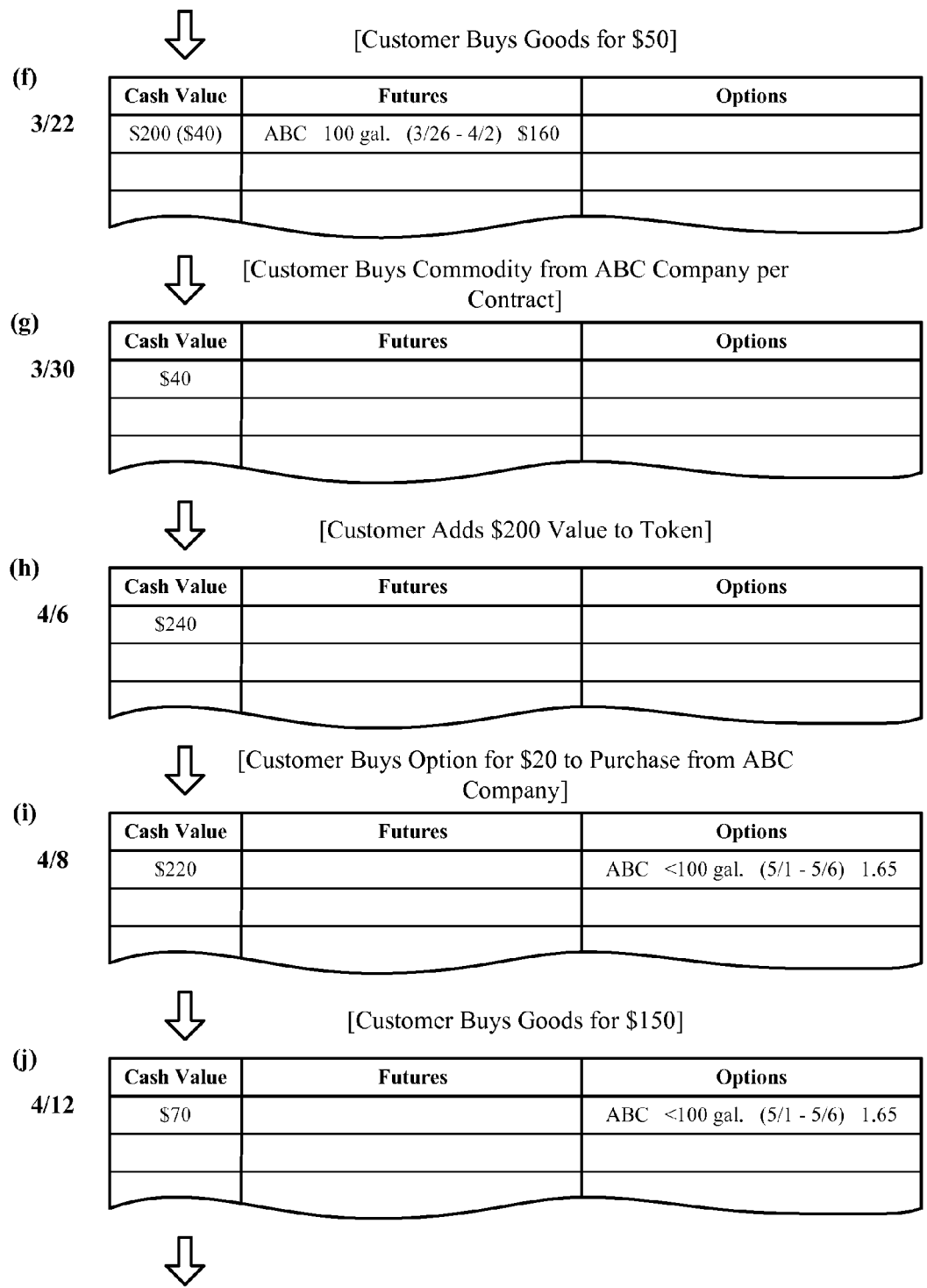
Figure 4C:
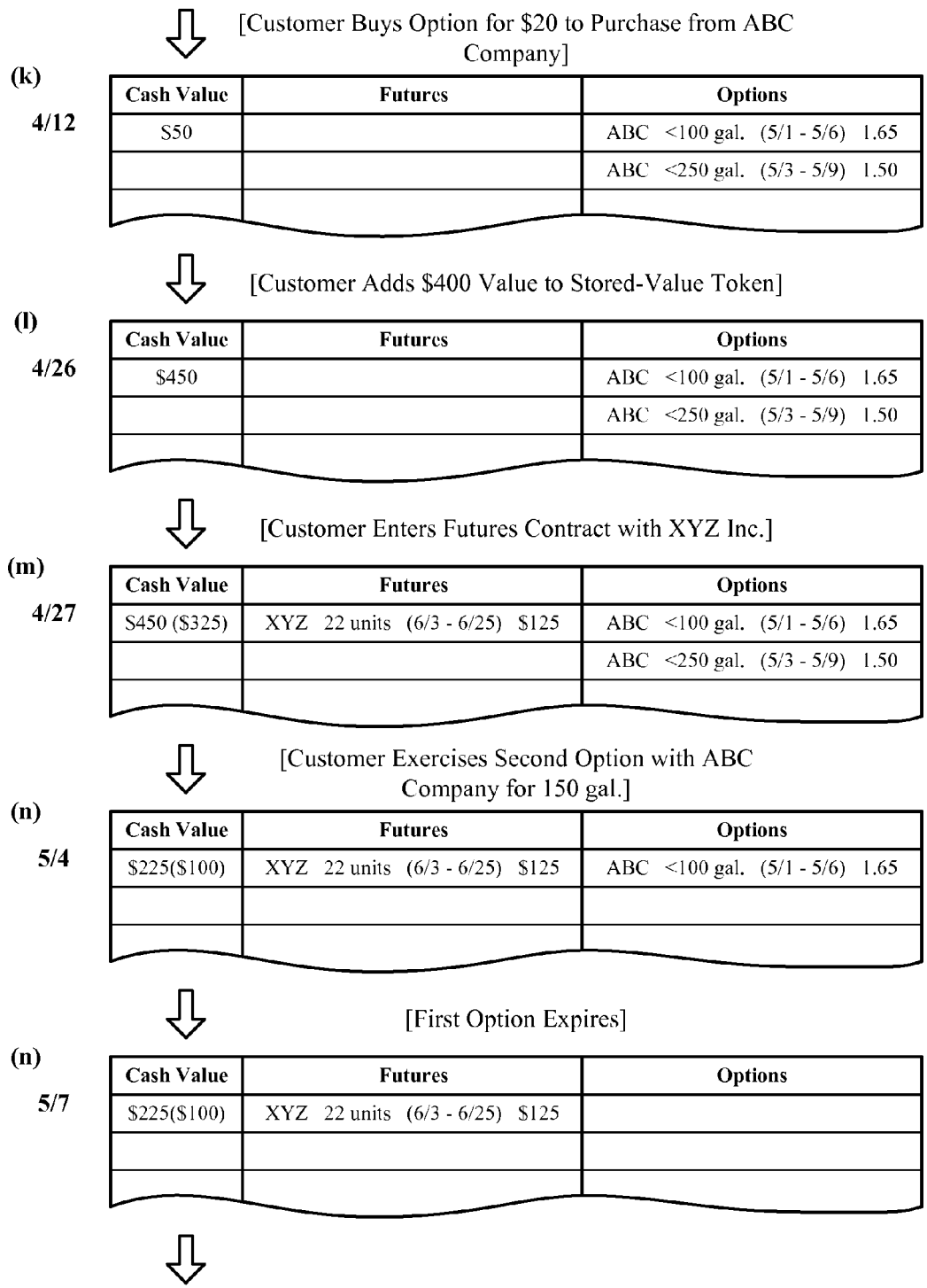

Methods of the invention as described generally in connection with FIG. 2 are illustrated with a specific example using the diagrams of FIGS. 4A-4C. These diagrams show an example of the type of information that may be maintained by the host system 138 for a particular account as the stored-value token is used by the customer to execute various derivative transactions and/or purchase transactions.

Part (a) of FIG. 4A shows an example of a record that may result when the customer initially purchases a stored-value token having a $100 value on February 1. Usually, the cost of the token to the customer is equal to its cash value, although in some instances the cost may be different. For instance, if tokens are provided as part of promotional programs, the initial cost to the customer may be less than the cash value; conversely, if tokens are sold as part of a fund-raising campaign, the initial cost to the customer may be greater than the cash value, with the excess value being donated to the fund-raisers. The record for the account maintained on the data store 140 is shown to include a cash value of $100 and no other entries, meaning that the value within the account may be used to support any transaction available with the stored-value token.

Part (b) of FIG. 4A shows the result of the customer using the stored-value card on February 15 to execute a purchase transaction for the purchase of goods for $50. The cash value in the account is thus reduced by that amount to $50. A subsequent addition of $200 of value by the customer on March 1 results in the record shown in part (c) of FIG. 4A, reflecting a cash value of $250. The operations shown in parts (a)-(c) of FIG. 4A thus illustrate traditional functionality of a reloadable stored-value account.

Part (d) of FIG. 4A shows the type of information that may be maintained when the card is used for execution of a derivative transaction, in this instance a futures transaction. The futures contract that underlies the executed futures transaction is a contract between the customer and ABC Company for the purchase of 100 gallons of gasoline at a cost of $160, the purchase to take place between March 26 and April 2. The futures transaction was approved because the available value in the account of $250 was greater than the contract amount of $160. Accordingly, the total cash value in the account is unchanged at $250, but the contract amount is frozen, leaving $90 of free value. The terms of the underlying contract are also recorded.

Because the free value is only $90, an attempt by the customer to execute a purchase transaction on March 20 is rejected, even though the total value in the account exceeds the transaction amount. The account record in part (e) of FIG. 4A is thus unchanged, still reflecting the same total and free value balances and maintaining a record of terms of the futures contract. Conversely, on March 22, when the customer executes a purchase transaction to buy goods for $50 using the stored-value token, the transaction is approved because the transaction amount is less than the free value. The record is thus updated in part (f) of FIG. 4B to reflect a reduction of $50 in both the total cash value stored in the account and in the amount of cash value that is free.

On March 30, i.e. within the time window for execution of the contract underlying the futures transaction, the customer visits a distribution center of the ABC company and executes the contract, purchasing the 100 gallons of gasoline for $160. The record maintained at the host system is initially used as described in connection with FIG. 2 to verify the terms of the contact, and is updated to reflect its execution. This is illustrated with part (g) of FIG. 4B, which shows both that the record of a future contract has been removed and that the value has been decremented by the contract amount. The remaining $40 of value is all free value.

When the customer adds an additional $200 of value to the account on April 6, the record is updated to reflect the new balance as shown in part (h) of FIG. 4B. The customer subsequently purchases an option from the ABC company on April 8 for the purchase of gasoline. The terms of the option are for an amount of gasoline less than 100 gallons at a rate of $1.65 per gallon, to be purchased between May 1 and May 6. The option transaction costs the customer $20 and ensures the availability of the terms as specified, but does not bind the customer to execute the option; if circumstances are such that the gasoline is not needed, or if the price drops in the interim, the customer may simply allow the option to expire. Accordingly, the updated record shown in part (i) of FIG. 4B shows that the terms of the option have been recorded and that the cash value has been decreased by the $20 payment made as part of executing the option transaction.

Because the option does not bind the customer, the value associated with the cost of executing the option, which may be up to $165, is not frozen and the entire $220 of value remains free. Thus, when the customer attempts to execute a purchase transaction on April 12 for $150, the transaction is approved even though the remaining value of $70 shown in part (j) of FIG. 4B is insufficient to cover the maximum potential option cost.

It is also possible for the system to record information regarding multiple derivatives. While generally there is no limit on the number of derivatives that may be accommodated at any time, the execution of derivative transactions being limited only by the need to have sufficient value to support binding derivatives like futures, it is possible in some embodiments for the system to limit the number of derivatives to some predetermined number or to some predetermined maximum value. An illustration of recording information regarding multiple derivatives is provided with part (k) of FIG. 4C, which shows how the record is updated when the customer executes a second option transaction to purchase a further option from ABC Company. In this instance, the option again costs $20, which is reflected be the reduction in cash-value balance for the stored-value account, and provides for the purchase of up to 250 gallons of gasoline at $1.50 per gallon between May 3 and May 9. The availability of such a second option with a lower price per gallon and a higher potential volume may reflect external changes in market conditions so that the expenditure of $20 by the customer to secure the second option may well result in a substantial savings overall.

Although the illustrations so far have shown examples of derivative transactions executed with a single company, the ABC Company, the system may permit derivative transactions to be executed with multiple different entities. Thus, the customer may wish to execute a futures transaction with XYZ Inc. and therefore adds $400 of value to the stored value account on April 26. This increase is reflected with the updated record shown in part (l) of FIG. 4C. On April 27, execution of the futures transaction to establish a futures contract for the purchase of 22 units at a cost of $125 between June 3 and June 25 is reflected in the updated record shown in part (m) of FIG. 4C. Because the futures contract binds the customer, the $125 of value is frozen so that the free value is identified in the figure as being $325.

On May 4, when the customer has the right to execute either or both of the options that have been recorded, he chooses to execute only the second option and to purchase 150 gallons of gasoline at $1.50 per gallon. The updated record in part (n) of FIG. 4C shows the corresponding reduction in total and free values by $225 and the removal of the information regarding the second option from the record. On May 7, when the first option expires, records related to it may simply be removed since the option has not been exercised, the removal of the record thereby preventing the option from being exercised outside the agreed time period.

Use of the stored-value token may proceed in this way indefinitely, with the customer adding value as desired and using the stored value to support purchase transactions and derivative transactions that the customer wishes to execute. In addition to records of the type illustrated in FIG. 4, the system may conveniently record historical track records of costs for the various commodities and other goods that are the subject of the derivative transactions. Such records may be valuable both to the customer and to the merchants who sell such goods.

2. Currency-Exchange Implementations

Derivative transactions may also be implemented in some embodiments by using currency-exchange mechanisms. Such currency-exchange are implemented in several embodiments as an adjunct to a money-transfer mechanism, with the specific examples discussed herein being illustrative of certain more general derivative mechanisms that are within the intended scope of the invention.

Figure 5:
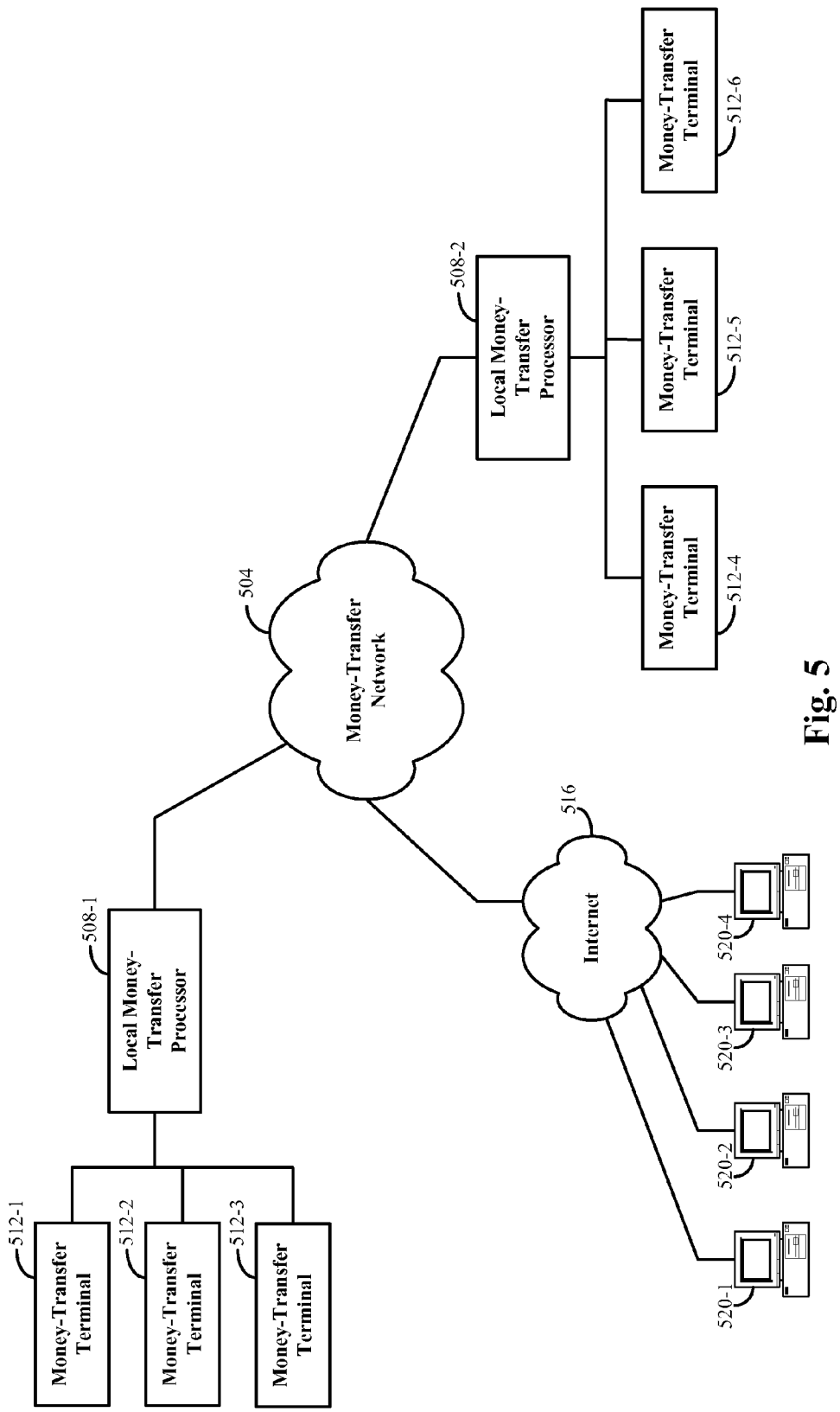
FIG. 5 is a block-diagram representation of an exemplary architecture that may be used for effecting money transfers in accordance with certain embodiments.

A structure that may be used to effect money transfers is illustrated with the block diagram of FIG. 5. The money transfers are effected through a money-transfer network 504 that provides a communications interface between various devices that may be used to initiate money transfers and to receive funds transferred in this manner. For example, local money-transfer processors 508 may be provided at various geographical locations and used to operate money-transfer terminals 512, with each of the money-transfer processors 508 being interfaced with the money-transfer network 504. In such instances, the processor 508 and terminals 512 are generally disposed at a physical location that operates as a money-transfer office. A customer may visit the office physically to arrange for funds to be transferred, providing the funds in cash or through some other mechanism, such as with a credit card or debit card. A clerk may operate one of the terminals 512 to provide information used in effecting the money transfer. Alternatively, the terminals 512 may comprise a self-service terminal operated by the customer herself in staging the money transfer. Similarly, such a physical location may be used by the recipient to receive the transferred funds with clerk-operated or with self-operated terminals to receive the funds. In embodiments where the money transfer includes a currency exchange, the physical locations of the initiating and receiving processor 508/terminal 512 are typically in different countries.

Money transfers may alternatively be staged using other types of interfaces with the money-transfer network 504. The drawing shows explicitly that the money-transfer network 504 may be interfaced with the Internet 516, which is in turn interfaced with various computational devices 520. This permits a customer to access money-transfer functionality by connecting his computational device 520 to the Internet 516 to access a web page where such functionality is implemented. With such an interface, the customer will usually provide funds for transfer by using a credit card, debit card, or similar mechanism that may be implemented electronically, instead of by providing cash. Other types of interfaces may be provided with the money-transfer network 504 in various alternative embodiments, including telephone interfaces that respond to DTMF tones, cable interfaces, wireless interfaces, and the like.

Figure 6:
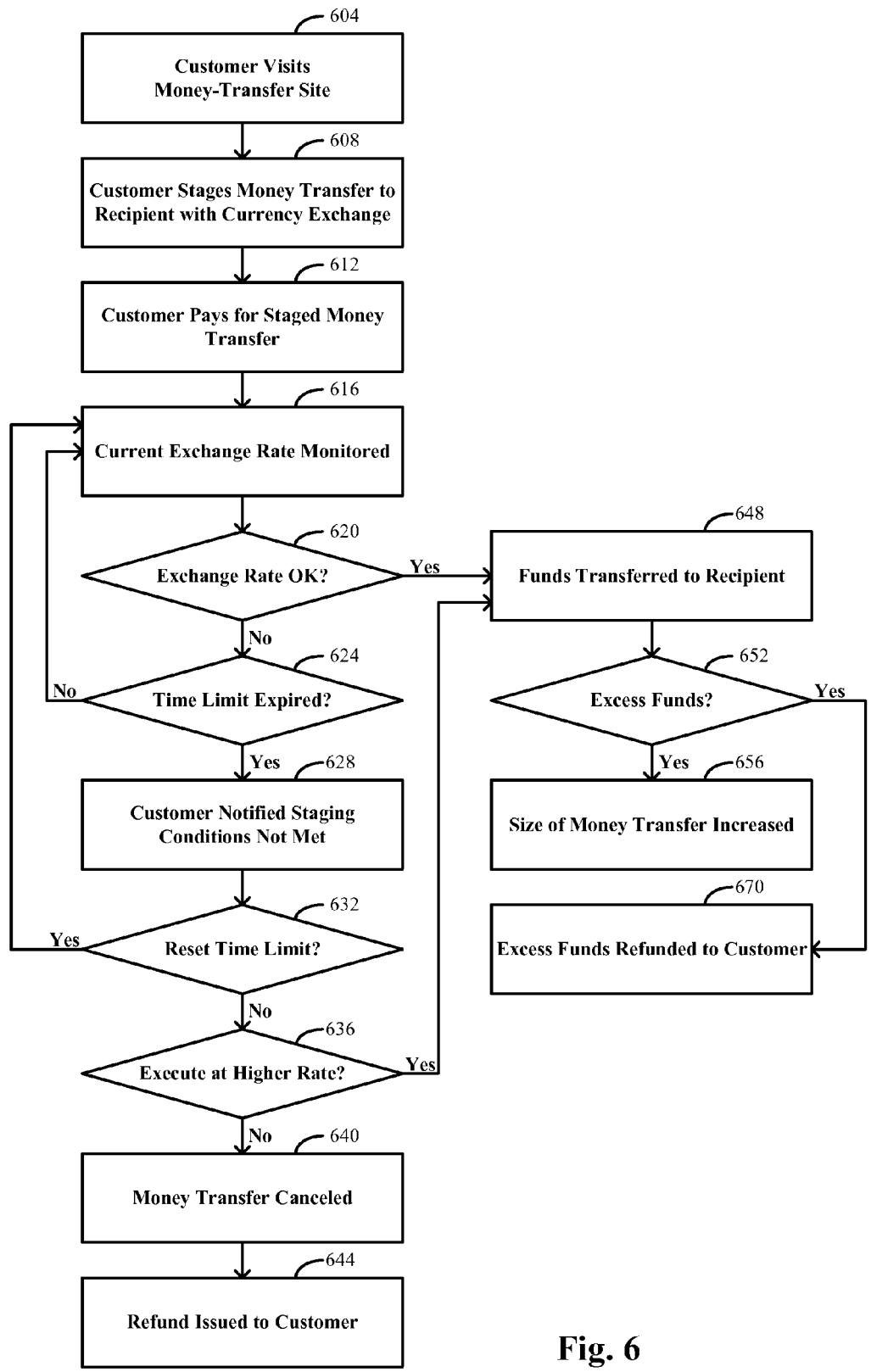
FIG. 6 is a flow diagram summarizing certain methods of the invention.

The flow diagram of FIG. 6 summarizes a number of different embodiments in which a money transfer is implemented with a derivative transaction. In these examples, the derivative transaction comprises a futures transaction linked to a currency exchange rate to be implemented with the money transfer. The money transfer is initiated with the customer visiting a money-transfer site at block 604, either by visiting a physical site where to access a money-transfer terminal 512 or by visiting a virtual site such as where the money transfer is initiated from a web site over the Internet 516. The money transfer is then staged by the customer at block 608. In staging the money transfer, the customer may provide a number of specifications, including the identity of the recipient of the money transfer, the amount of money to be transferred, the location to which the money is to be transferred, the currency in which the money to be transferred is supplied and the currency in which the money transferred is to be received, and the like. When the currency is to be changed as part of the money transfer, embodiments of the invention permit the customer to impose a limit on the exchange rate to be applied. For example, if the customer wishes to transfer US$100 to a recipient in Mexico and to have the Mexican recipient receive the transferred money in Mexican pesos, the customer could require that the exchange rate be at least 10 pesos/US$ before the transfer is executed. In other embodiments, the size of the money transfer may be specified in terms of the amount to be received by the recipient, such as by specifying that M$1000 are to be transferred.

The customer pays for the staged money transfer at block 612, generally paying a service charge in addition to the amount of money that is to be transferred. Payment may be made in a variety of different ways in different embodiments, including by cash, by credit card, by debit card, by check, or by any other suitable payment mechanism. The applicable exchange rate is accordingly monitored at block 616. Such monitoring may be substantially continuous, permitting the money transfer to be executed essentially as soon as the exchange rate becomes acceptable. Alternatively, the monitoring may be periodic so that the exchange rate is checked at different times. Such periodic monitoring, because it effectively samples the rates, may result in overlooking certain windows in which an acceptable exchange rate might have been used. At the same time, such periodic monitoring may also cause the system to respond when an even more favorable rate than the trigger value is available, while continuous monitoring would effectively always respond when the exchange rate is at the trigger value.

A check is accordingly made, for either type of monitoring, at block 620 whether the current exchange rate is consistent with the terms established by the customer at that moment in time. If not, a number of different possibilities exist for responding, depending on other conditions that may have been specified by the customer. For example, a check is made at block 624 whether a time limit imposed by the customer has expired. If not, the method may simply continue to monitor the current exchange rate at block 616 as it fluctuates.

If the time limit has expired, or if some other condition has not been satisfied to indicate that the staging conditions have not been met, the customer may be notified of that determination at block 628. Subsequent action may then proceed either on the basis of further instructions provided by the customer, on the basis of prior instructions provided by the customer at the time of staging, or in accordance with default procedures in different embodiments. For instance, the customer may indicate that the time limit is to be reset, a check for which is indicated at block 632. Such an indication may be given explicitly by the customer after notification of the failure to meet the staging conditions, or could be a way of implementing a protocol where specified time limits are restricted to integral multiples of a base time limit.

Another option that may be provided is the option to execute the money transfer at the higher exchange rate, as checked at block 636. If the customer declines to do so, either in accordance with standing or new instructions, the money transfer may be canceled at block 640 and a refund of amounts paid, perhaps less a service charge, refunded to the customer at block 644.

Thus, in the embodiments illustrated by FIG. 6, execution of the staged money transfer may occur when the exchange rate is identified as being within an acceptable range or when a decision has been made to execute the transfer notwithstanding the failure of the exchange rate to fall within the acceptable range. In either case, the funds are transferred to the recipient over the money-transfer network 504 at block 648 using methods known to those of skill in the art. Such a funds transfer applies the current currency exchange rate and may sometimes result in there being an excess of funds as a result of the fluctuation of the exchange rate. This is especially possible in embodiments where the transfer amount is specified in terms of the amount to be provided to the recipient and where the exchange rate is monitored only periodically.

A check may thus be made at block 652 whether there are excess funds, with different options being available for handling the excess funds. Such options may be selected by the customer upon notification of the existence of the excess funds, could have been identified by the customer at the time of staging the money transfer at block 608, or could be performed in accordance with a default protocol. In some instances, as indicated at block 656, the size of the money transfer may be increased in accordance with the excess funds made available by the favorable exchange rate. Alternatively, as indicated at block 670, the excess funds may be refunded to the customer.

3. Prepaid, Unit-Based Gas Card Implementations

Figure 7:
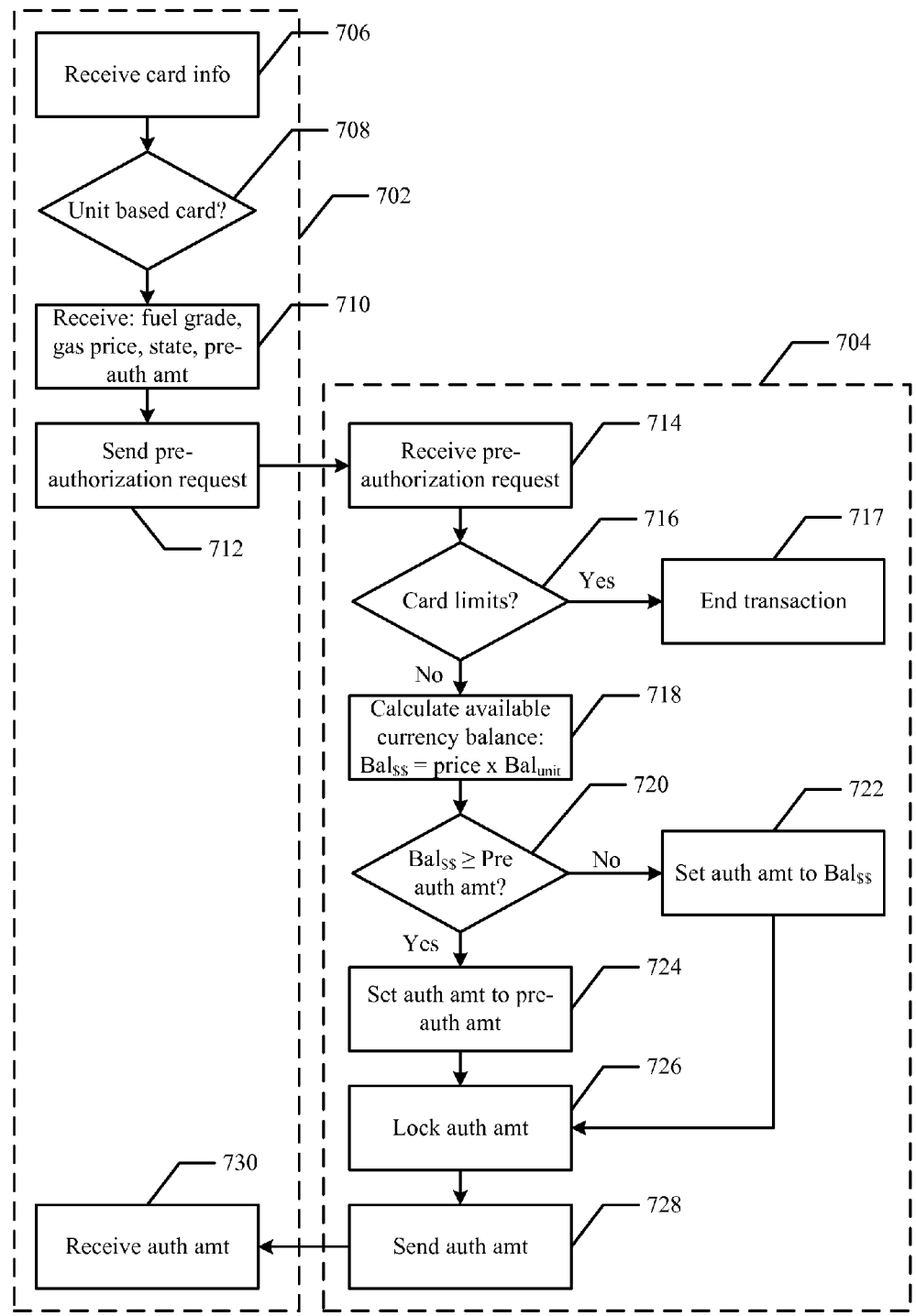
FIG. 7 is a flow diagram summarizing a method of preauthorizing a gas purchase using a pre-purchased unit-based gas card.

FIG. 7 shows a flow diagram 700 summarizing a method of preauthorizing a gas purchase using a pre-purchased unit-based gas card according to one embodiment of the invention. The method may be used in conjunction with a preloaded presentation instrument for purchasing gasoline from gas stations, for example, a preloaded gas card. The presentation instrument may be purchased and preloaded with a number of gallons. For instance, a user may purchase a preloaded gas card with a set number of gallons. For example, the consumer may buy a gas card with 25 gallons or 50 gallons. If the price-per-gallon is set at the time of the purchase at $2.00 per gallon, the consumer would purchase the preloaded gas card for $50 and $100 respectfully.

The preloaded gas card may then be used to purchase gallons of gasoline from participating gas stations. The number of gallons preloaded on the gas card may be decreased according to the number of gallons purchased. If the consumer wishes to purchase more than the number of gallons left on the gas card, they may present a second form of payment to pay for the surplus gas.

According to the flow diagram 700, card info is received from a user 706 at a point of sale device 702. The card info may be received from a card reader and/or a RFID reader. The consumer may be asked to enter a PIN, password and/or biometric sample to confirm ownership of the gas card. The card information may include account number, name, etc. The POS device 702 may then determine whether the card is, indeed, a unit-based gas card at block 708. A gift card or other card may also be used at the card reader. Accordingly, a determination regarding the type of card entered into the card reader must occur. A gas card, for example, may include a numeric code that differs from a gift card and which may be used to distinguish gas cards (or unit-based cards) from gift cards.

If the card is a preloaded gas card, the method receives the fuel grade, gas price, geographic location, and preauthorization amount at block 710. This information, the fuel grade, gas price, geographic location, and preauthorization amount, may then be packaged as part of a preauthorization request.

The fuel grade selection may be received from the user through the user interface. For example, once the unit-based card has been recognized, the user may be prompted for a fuel grade selection. The gas price may be received from physical memory and associated with the fuel grade selection. The geographic information may include a zip code and or state code. Gas prices vary from state to state, location to location and across zip codes. Accordingly, some preloaded gas cards may be geographically limited. For example, the gas cards may only be used in specific locations, such as states and/or zip codes. The POS device 702 may also receive a preauthorization amount from memory. The preauthorization request may then be sent to a financial processor at block 712.

At the financial processor 704, the preauthorization request is received at block 714. The financial processor may then determine whether any limits are associated with the account and if the preauthorization request satisfies those limits. For example, the financial processor may compare the geographic location information received from the POS and determine whether the geographic location is within the limits set by the account. As another example, the gas card may be limited to certain fuel grade, such as, premium or high octane. If the grade selection does not match the grade type associated with the gas card, then the transaction will terminate. Other limitations may also be applied to the account. If the limits are not met, the transaction ends at block 717. If the limits are met, then the financial processor calculates the current currency amount of the balance of the card at block 718. The current currency balance ($Bal_{\$\$}$) is determined by multiplying the unit balance ($Bal_{unit}$) on the card by the price-per-gallon (price) received in the preauthorization request. If the current currency amount is greater than or equal to the preauthorization amount, as determined at block 720, then the authentication amount is set equal to the preauthorization amount at block 724, otherwise the authorization amount is set to the current currency balance at block 722. The financial processor then locks an amount equal to the authorization amount on the card at block 726. The financial processor then sends the authorization amount to the POS at block 728. Wherein, the POS receives the authorization amount at block 730 and limits the transaction to the authorization amount.

Figure 8:
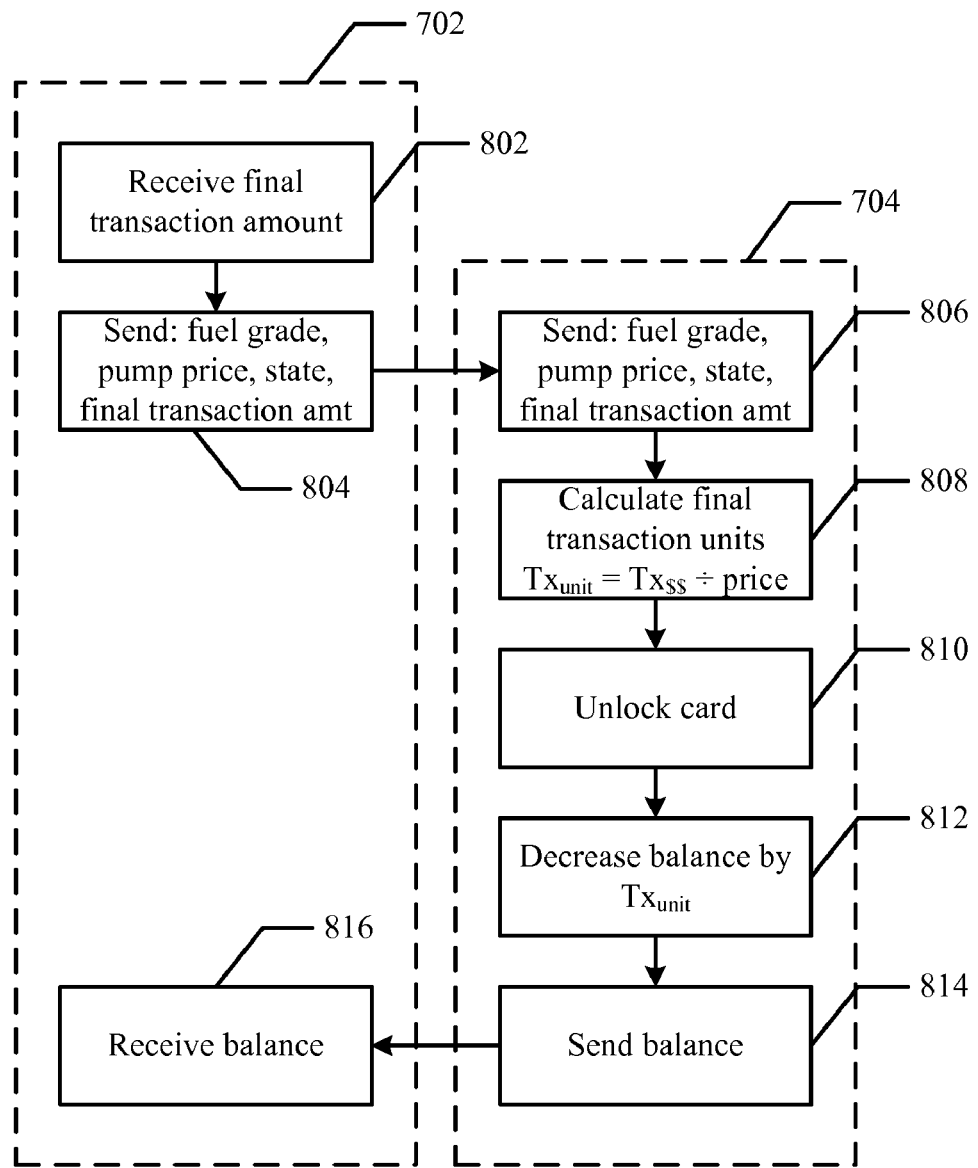
FIG. 8 is a flow diagram summarizing a method of settling a gas purchase using a pre-purchased unit-based gas card.

FIG. 8 shows a flow diagram 800 summarizing a method of settling a gas purchase using a pre-purchased unit-based gas card. Such a gas card may have been previously authorized, for example, using methods described above in regard to FIG. 7. Once a user has been preauthorized to user their unit-based gas card, the consumer may dispense gas. In one embodiment of the invention, the gas is dispensed from a gas pump coupled with the POS 702. When the user has finished dispensing the gas, the POS device 702 receives a final transaction amount at block 802. The POS 702 may then send information to the financial processor 704, including, for example, the final transaction amount, fuel grade, price-per-gallon, and/or geographic location at block 804.

The financial processor 704 may receive this information at block 806. Whereupon, the final number of gallons dispensed may be calculated using by dividing the final transaction amount by the price-per-gallon at block 808. The card may then be unlocked at block 810, and the preloaded balance may be decreased by the number of gallons. The financial processor 704 may then send the remaining balance of the prepaid unit-based gas card to the POS at blocks 814, 816. The POS 702 may communicate the remaining balance of the gas card to the user. The balance may also be printed on a receipt.

In another embodiment of the invention, if the balance on the prepaid unit-based gift card is not sufficient to cover the preauthorization amount and/or the user dispenses more gas than the prepaid unit-based gas card can accommodate, then the POS may receive a second presentation instrument to cover the remainder of the transaction. For example, if the user has a prepaid user-based gas card with 9 gallons at a gas price of $3.00 per gallon and the preauthorization amount is $50, then the gas card may not be preauthorized at $50, because the gas card effectively has an $27 balance. Accordingly, the financial processor may communicate to the POS that the transaction is only approved up to $27 or 9 gallons. The POS may then ask the user to present a second presentation instrument if they chose to dispense more than $27 or 9 gallons of gas.

With embodiments of the present invention, users may purchase preloaded unit-based gas cards when the price of the gas seems low. For example, a user may purchase a preloaded unit-based gas card with 100 gallons of gas for $231 when the price-per-gallon of the gas is $2.31. The user may use the preloaded unit-based gas card when the price-per-gallon of gas is $2.85 and, therefore, pay only $2.31 per gallon when the price is at $2.85.

Other embodiments of the invention may include POS devices and/or methods for offering unit based transactions based on propane or other fuels; building materials, such as lumber, masonry, gravel, sand, concrete, drywall, etc; landscaping materials and/or services; produce, such as milk, fruit, vegetables, poultry, beef, etc; bulk goods; entertainment, etc. Any product or service may be included in a unit based transaction.

Embodiments of the invention may extend to purchases of gas in various other currencies and/or measures of volume. For instance, the gas card may be used for liters and in Pounds. Currency and/or volumetric conversions may also be applied.

While the above description has focused on specific embodiments where variation in exchange rates is used to trigger execution of a future money transfer, other embodiments may more generally embrace either types of future transactions that depend on a varying parameter. In particular, embodiments of the invention may more generally permit a transaction to be staged that depends on a varying parameter taking a value in a specified range, with the transaction being executed when the value of the parameter is within that range. For example, in gambling contexts, placement of a wager might be staged to be dependent on certain payoff odds or on certain point spreads. A horse-racing wager, for instance, might be staged on a particular horse to place only if the payoff odds became more favorable than 5:1. The varying odds would then be monitored and the wager placed when the condition was satisfied. Similarly, a football wager might be staged on a particular team when the point spread for payoff became more favorable than 15 points, with the wager being placed when the condition was satisfied. Still further examples of such transactions will be evident to those of skill in the art after reading this description.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A point of sale (POS) device coupled with a gas pump, the POS device comprising:

a user interface comprising at least a card reader;

a network interface in communication with a financial processor; and computational logic, wherein the computational logic is configured to:
    determine whether the account number is associated with a unit-based prepaid as card where a certain number of units of as have been previously paid for at a certain price;
    receive an account number associated with a presentation instrument through the card reader;
    receive an indication of a gas type from a user through the user interface;
    transmit an authorization request through the network interface to the financial processor, the authorization request including the account number, gas type and an indication of a price-per-gallon for the gas type; and
    receive an indication from the financial processor through the network interface whether the presentation instrument is approved to purchase gas.

2. The method of claim 1, wherein the computational logic is further configured to receive an currency-based authorization amount from the financial processor, and limit the transaction to the currency-based authorization amount.

3. The method of claim 1, wherein the computational logic is further configured to receive an indication of the amount of gas approved for a transaction.

4. The method of claim 1 further comprising a gas pump interface.

5. The method of claim 4, wherein the gas pump interface communicates information to the POS selected from the group consisting of the price-per-gallon, the number of gallons, and transaction amount.

6. The method of claim 4, wherein the gas pump interface sends an authorization amount to the gas pump through the gas pump interface.

* * * * *